(12) United States Patent
Eberlein (10) Patent No.: US 11,218,388 B2
(45) Date of Patent: *Jan. 4, 2022

(54) TENANT ISOLATED DATA IN SHARED REUSABLE SERVICES

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,963

(22) Filed: Jun. 9, 2020

(65) Prior Publication Data

US 2020/0304385 A1   Sep. 24, 2020

Related U.S. Application Data (63) Continuation of application No. 15/883,680, filed on Jan. 30, 2018, now Pat. No. 10,715,405.

(51) Int. Cl.
| | |
|---|---|
| *H04L 12/24* | (2006.01) |
| *H04L 29/08* | (2006.01) |
| *H04L 29/06* | (2006.01) |
| *G06F 16/21* | (2019.01) |

(52) U.S. Cl.
CPC .......... *H04L 41/5096* (2013.01); *G06F 16/21* (2019.01); *H04L 41/0806* (2013.01); *H04L 67/10* (2013.01); *H04L 67/306* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,523,142 | B2 | 4/2009 | Driesen et al. |
| 7,657,575 | B2 | 2/2010 | Eberlein et al. |
| 7,720,992 | B2 | 5/2010 | Brendle et al. |
| 7,734,648 | B2 | 6/2010 | Eberlein |
| 7,739,387 | B2 | 6/2010 | Eberlein et al. |
| 7,894,602 | B2 | 2/2011 | Mueller et al. |
| 7,962,920 | B2 | 6/2011 | Gabriel et al. |
| 7,971,209 | B2 | 6/2011 | Eberlein et al. |
| 8,126,919 | B2 | 2/2012 | Eberlein |
| 8,200,634 | B2 | 6/2012 | Driesen et al. |
| 8,225,303 | B2 | 7/2012 | Wagner et al. |
| 8,250,135 | B2 | 8/2012 | Driesen et al. |
| 8,291,038 | B2 | 10/2012 | Driesen |
| 8,301,610 | B2 | 10/2012 | Driesen et al. |
| 8,302,160 | B2 | 10/2012 | Hofmann et al. |
| 8,311,521 | B1 * | 11/2012 | Paczkowski ............ H04W 8/18 455/414.1 |
| 8,316,422 | B2 | 11/2012 | Hofmann et al. |

(Continued)

OTHER PUBLICATIONS

U.S. Appl. No. 14/960,983, filed Dec. 7, 2015, Eberlein et al.

(Continued)

*Primary Examiner* — Younes Naji
(74) *Attorney, Agent, or Firm* — Fish & Richardson P.C.

(57) ABSTRACT

A Tenant request to subscribe to an Application is received. A Service that the Application consumes is determined. The Tenant is determined to be new to the Service. In response to determining the Tenant is new, a subscription of the Tenant is provided in the Service, and the Application is added to the subscription.

18 Claims, 6 Drawing Sheets

(56) References Cited

U.S. PATENT DOCUMENTS

| | | |
|---|---|---|
| 8,321,678 B2 | 11/2012 | Hofmann et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,543,994 B2 | 9/2013 | De Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 3/2016 | Mayer et al. |
| 9,724,757 B2 | 8/2017 | Barrett |
| 10,057,273 B1* | 8/2018 | Chakraborty ............ G06F 21/62 |
| 10,715,405 B2 | 7/2020 | Eberlein |
| 2007/0027927 A1* | 2/2007 | Theis ...................... G06F 16/10 |
| 2008/0120129 A1 | 5/2008 | Seubert et al. |
| 2009/0288084 A1* | 11/2009 | Astete ................ G06Q 30/0601 |
| | | 718/1 |
| 2010/0153341 A1 | 6/2010 | Driesen et al. |
| 2010/0161648 A1 | 6/2010 | Eberlein et al. |
| 2010/0250608 A1* | 9/2010 | Malviya ................ G06F 16/217 |
| | | 707/792 |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0089622 A1* | 3/2015 | Sondhi ..................... H04L 63/20 |
| | | 726/9 |
| 2015/0100546 A1 | 4/2015 | Eberlein et al. |
| 2015/0178332 A1 | 6/2015 | Said et al. |
| 2015/0296027 A1* | 10/2015 | Bak ..................... H04L 67/2804 |
| | | 709/202 |
| 2016/0028855 A1* | 1/2016 | Goyal ..................... H04L 43/10 |
| | | 709/203 |
| 2016/0307122 A1* | 10/2016 | Cincotta ............ G06Q 30/0269 |
| 2017/0025441 A1 | 1/2017 | Mori |
| 2019/0190912 A1 | 6/2019 | De Boer et al. |
| 2019/0238426 A1 | 8/2019 | Eberlein |

OTHER PUBLICATIONS

U.S. Appl. No. 15/083,918, filed Mar. 29, 2016, Eberlein et al.
U.S. Appl. No. 15/087,677, filed Mar. 31, 2016, Eberlein et al.
U.S. Appl. No. 15/356,190, filed Nov. 18, 2016, Eberlein.
U.S. Appl. No. 15/581,459, filed Apr. 28, 2017, Eberlein et al.
U.S. Appl. No. 15/593,830, filed May 12, 2017, Eberlein et al.
U.S. Appl. No. 15/847,627, filed Dec. 19, 2017, De Boer et al.
Non-Final Office Action issued in U.S. Appl. No. 15/883,680 dated Aug. 5, 2020, 15 pages.

* cited by examiner

FIG. 6 ced computer processing speed and preserving other computer resources (for example, memory storage, network bandwidth, data throughput, and graphical user interface display speed). Fourth, computational and management burdens (for data isolation per Tenant) on the Applications are reduced. Fifth, the ability to create and bind instances of a Service (or "Service Instances") per Applications in those spaces where corresponding Applications are deployed, can be achieved. Sixth, costs can be allocated to the owners of the respective spaces (for example, in a Platform as a Service environment (PaaS)), where corresponding Service Instances are created.

TENANT ISOLATED DATA IN SHARED REUSABLE SERVICES

CLAIM OF PRIORITY

This application claims priority under 35 USC § 119(e) to U.S. patent application Ser. No. 15/883,680, filed on Jan. 30, 2019, the entire contents of which are hereby incorporated by reference.

BACKGROUND

Reuse services (or "Services") available in network computing (for example, a multi-tenant cloud-computing environment) can provide Services to groups (such as, a company or other organization) of users (or "Tenants") through software applications (or "Applications"). In multi-Tenant Services, it is desired to share as many resources as possible, without endangering (for example, exposing to or sharing with other Tenants or Applications) each Tenant's data. Data separation can be accomplished based on the Application that uses the Service. One technique is to bind Applications to instances of the Service (or "Service Instances"), and manage the instances with Service Brokers. In this technique an Application is the exclusive owner of a Service Instance and any data that the Service puts into the Service Instance is isolated from other Applications. This understanding of isolation is also leveraged by multi-Tenant enabled Applications that separate their Tenant's data by creating a dedicated Service Instance per Tenant. However, this technique does not provide an efficient structure for data separation per Tenant.

SUMMARY

The present disclosure describes data isolation in multi-tenant reuse services (or "Services").

In an implementation, one or more computers receive a Tenant request to subscribe to an Application. By the one or more computers, a Service that the Application consumes is determined. By the one or more computers, the Tenant is determined to be new to the Service, and a subscription of the Tenant in the Service is provided. By the one or more computers, the Application is provided to be added to the subscription of the Tenant in the Service.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, techniques to support scenarios where data isolation by tenants (or "Tenants") is required, is provided. Second, data security is improved because Tenants of the same software application (or "Application") can be mapped to different persistencies in the Service that supports the Application. Third, techniques for managing persistency lifecycle are provided, which results in improving overall computer processing speed and preserving other computer resources (for example, memory storage, network bandwidth, data throughput, and graphical user interface display speed). Fourth, computational and management burdens (for data isolation per Tenant) on the Applications are reduced. Fifth, the ability to create and bind instances of a Service (or "Service Instances") per Applications in those spaces where corresponding Applications are deployed, can be achieved. Sixth, costs can be allocated to the owners of the respective spaces (for example, in a Platform as a Service environment (PaaS)), where corresponding Service Instances are created.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DETAILED DESCRIPTION

The following detailed description describes techniques for data isolation in multi-tenant reuse services (or "Services"). Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Services available in network computing (for example, a multi-tenant cloud-computing environment) can provide Services to a plurality of users (or "Tenants") through software applications (or "Applications"). In multi-Tenant Services, it is desired to share as many resources as possible, without endangering each Tenant's data (for example, exposing to or sharing each Tenant's data with other Tenants or Applications). Data separation can be accomplished based on the Application that uses the Service. One technique is to bind Applications to instances of the Service (or "Service Instances"), and manage the instances with Service Brokers. In this technique an Application is an exclusive owner of a Service Instance and any data that the Service puts into the Service Instance is isolated from other Applications. This understanding of isolation is also leveraged by multi-Tenant enabled Applications that separate their Tenant's data by creating a dedicated Service Instance per Tenant. However, this technique does not provide an efficient structure for data separation per Tenant.

A Service Instance can be as computing resource intensive as a dedicated deployment of a Service on hardware designed exclusively for the performing the Service for an Application. A Service Instance can also be as light (from a computing resource standpoint) as an identifier (for example, a key in a database table) of a central Service shared by all Applications. As previously mentioned, an Application is the exclusive owner of a Service Instance and any data that the Application puts into the Service Instance is isolated from other Applications.

One example of a Service Instance is a database schema. While a database system hosting many schemas is shared, an individual Service Instance (which can be considered a schema) is used exclusively by the Application bound to that Service Instance.

This understanding of isolation is also leveraged by multi-Tenant-enabled Applications that separate Tenant data by creating a dedicated Service Instance per Tenant and manage the instances with an Instance Manager (for example SAP's INSTANCE MANAGER). In case of a database Service that provides individual schemas as Service Instance (for example in SAP HANA) this technique results in a schema-per-Tenant isolation on database level.

However, this technique does not provide an efficient structure for data isolation per Tenant. A Tenant-unaware Service can only separate data by the Service Instance used, which may be mapped by an Application to a Tenant. However, this practice is overly complex because it requires an extensive use of an Instance Manager and puts a lot of management burdens (such as computational and categorization burdens) on the consumer side (that is, on the Applications). A multi-Tenant Application using this technique would need to use an Instance Manager to deal with the Tenant-instance mapping because the Service itself does not distinguish between the Tenants, but knows about the Service Instances. Further, the technique would require all Applications to be deployed to the same space as Service Instances cannot be bound to Applications across spaces.

In Platform as a Service (PaaS) environments, multiple software providers use the same cloud platform, but each one of the software providers receive one or several spaces that isolate their particular Applications and Service Instances from those of others. A "space" can be considered to "virtualize" a PaaS for a software provider building their own Applications on the PaaS platform. By associating Service Instances to the spaces in which they are created, a cost from the service can be assigned to the owning software provider. The software providers can then sell the solution they build to their Tenants and charge them for use of their software. The Tenants however are not aware of the underlying PaaS or the space in the PaaS or the Services used or the cost incurred; this is all handled by the software vendor.

What is needed, however, is the ability to create and bind Service Instances per Application in those spaces where the corresponding Applications are deployed. The reason for this is an "ownership" principle associated with Service Instances, which, in some implementations, can be stated as: whoever creates an instance, owns that instance, and consequently, has to pay for the instance. If different Applications use the same Service, it must be possible to allocate the incurred cost to the correct Application, independent of whether all Applications access shared or isolated data. By creating dedicated Service Instances for each Application and hosting the Service Instance spaces owned by the respective Applications, costs can be allocated to the owners of the respective spaces where the corresponding Service Instances have been created.

Figure 1:
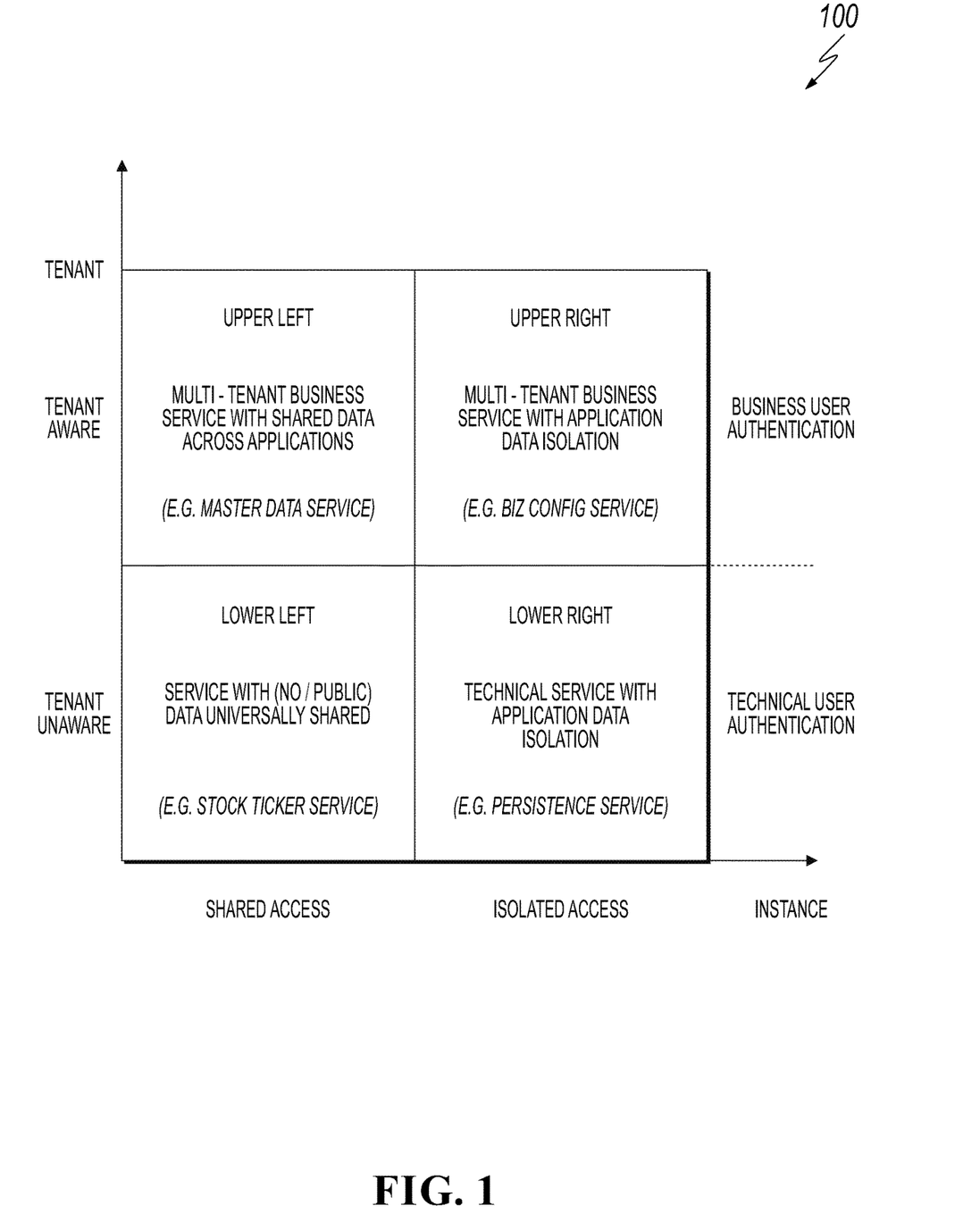
FIG. 1 illustrates a Service categorization based on data separation, according to an implementation of the present disclosure.

Turning to FIG. 1, FIG. 1 illustrates Service categorization based on data isolation, according to an implementation of the present disclosure. Services in this categorization are divided based on their abilities regarding two levels of data isolation: instance, and Tenant.

At an instance level, a Service is aware of Service Instances and separates data per Application by providing one instance per Application. At a Tenant-level, a Service is aware of a Tenant that requests (or uses) the Service. Instance and Tenant levels are illustrated as dimensions in FIG. 1. There are four types of Services presented in FIG. 1.

A first type of Service is neither Tenant-aware nor isolated by instances. The lower left corner of FIG. 1 represents these Services (or "lower left corner Services"). Examples of these Services include Services associated with public data (such as, GOOGLE MAPS, weather forecast, and stock ticker). Applications that use this type of Service provide the same information, irrespective of who (which Application or Service) has requests the Service.

A second type of Service is Tenant-unaware, but isolated by instance. The lower right corner of FIG. 1 represents this type of Service (or "lower right Service"). As explained above, these Services isolate Applications by Service Instances. An example of this Service type is a Service that provides a database consisting of schemas as Service Instances and each Application that consumes the Service, obtains a schema exclusive to the Application.

A third type of Service is Tenant-aware, but not isolated by instance. Upper left corner of FIG. 1 represents this type of Service (or "upper left Service"). An upper left Service provides shared access across its instances. An example of this type of Service is MASTER DATA (or "Master Data"). For example, if a Service provides trading information, a Tenant may desire similar access to the trading information regardless of whether a financial or a trading Application is used. Therefore, accessing Applications are not distinguishable in an upper left Service and the Service provides the same Service to different accessing Applications. In some implementations, these Services can still follow standards of a network computing environment (for example a cloud-computing environment such as CLOUD FOUNDRY) regarding Service Instances, but the data can still be shared across the Service Instances. These Services, however, isolate the data by Tenants.

A fourth type of Service is Tenant-aware and isolated by instance. Upper right corner of FIG. 1 represents this type of Service (or "upper right Service"). This type of Service provides isolation both on a Tenant and on an instance level. An example of this type are Services similar to Master Data, but are also Application-specific. Thus, in the previous example, an upper right Service provides trading information in a Service Instance specific to the financial Application, and another Service Instance specific to the trading Application.

At a high-level, this disclosure provides techniques to isolate data per Tenant in multi-Tenant (or shared) Services. At lower-level, the disclosure discusses events that result in creation and deletion of containers that isolate the data per Tenant (or instance, or both Tenant and instance).

The implementations according to the present disclosure can reduce computational and managerial burdens on an Application since the Application only needs to bind one single instance of a Service for all its Tenants and the burden of Tenant isolation is pushed to the Service. Further, each Application has its own view of a Tenant's data, even if the same Tenant uses different Applications that all consume the same Service.

In some implementations, a multi-Tenant Service creates persistencies to distinguish the Tenants. In some implementations, a persistence management is used to enable a Service prepare its own persistencies. Without persistence management it might be challenging for Service providers to decide on how to implement data isolation in the four types of Services (especially in Tenant-aware Services). While discriminatory columns for instances and Tenants in tables of a shared database container is a valid option for data separation, data volume, data management, or extensibility requirements may demand dedicated containers that isolate the data per instance, Tenant or even the combination of instance and Tenant. One question to be asked in this case is which events trigger creation or deletion of such containers.

In some implementations, a solution to this question is Services that use containers to isolate data by Service Instance (the lower and upper right Services) using Service brokers such as CLOUD FOUNDRY SERVICE BROKER APIs to create or delete a container when a Service Instance is created or deleted.

Services that use containers to isolate data by Tenant (upper left and right Services) need a comparable management scheme for creating or deleting a persistency when a Tenant subscribes or unsubscribes to an Application that consumes the Service. The persistence management discussed in this disclosure manages Tenant persistency and subscription, in Tenant-aware Services.

In some implementations, Tenant-aware Services can register with an On-boarding Service to receive an on-boarding or off-boarding callback whenever a Tenant subscribes or unsubscribes an Application that consumes the Service. As multiple Applications might consume the same Service, a Service may receive several on-boarding/off-boarding calls per Tenant. However, creating a container upon receiving an on-boarding and deleting a container upon receiving an off-boarding call is not an efficient practice in terms of data volume (storage) and management. Further, if data is to be shared among different Applications (upper left corner), the same container should be used for all Service Instances that use the data to implement shared access to the data. In some implementations, a reference counter is implemented to let the Service decide when to add a new or delete an existing container for a Tenant. In some implementations, when a Service Instance is created, a container is also created for the Tenant associated with the Service Instance. As a result, single-Tenant Applications and developer that have no Tenant on-boarding callback can be supported.

Figure 2:
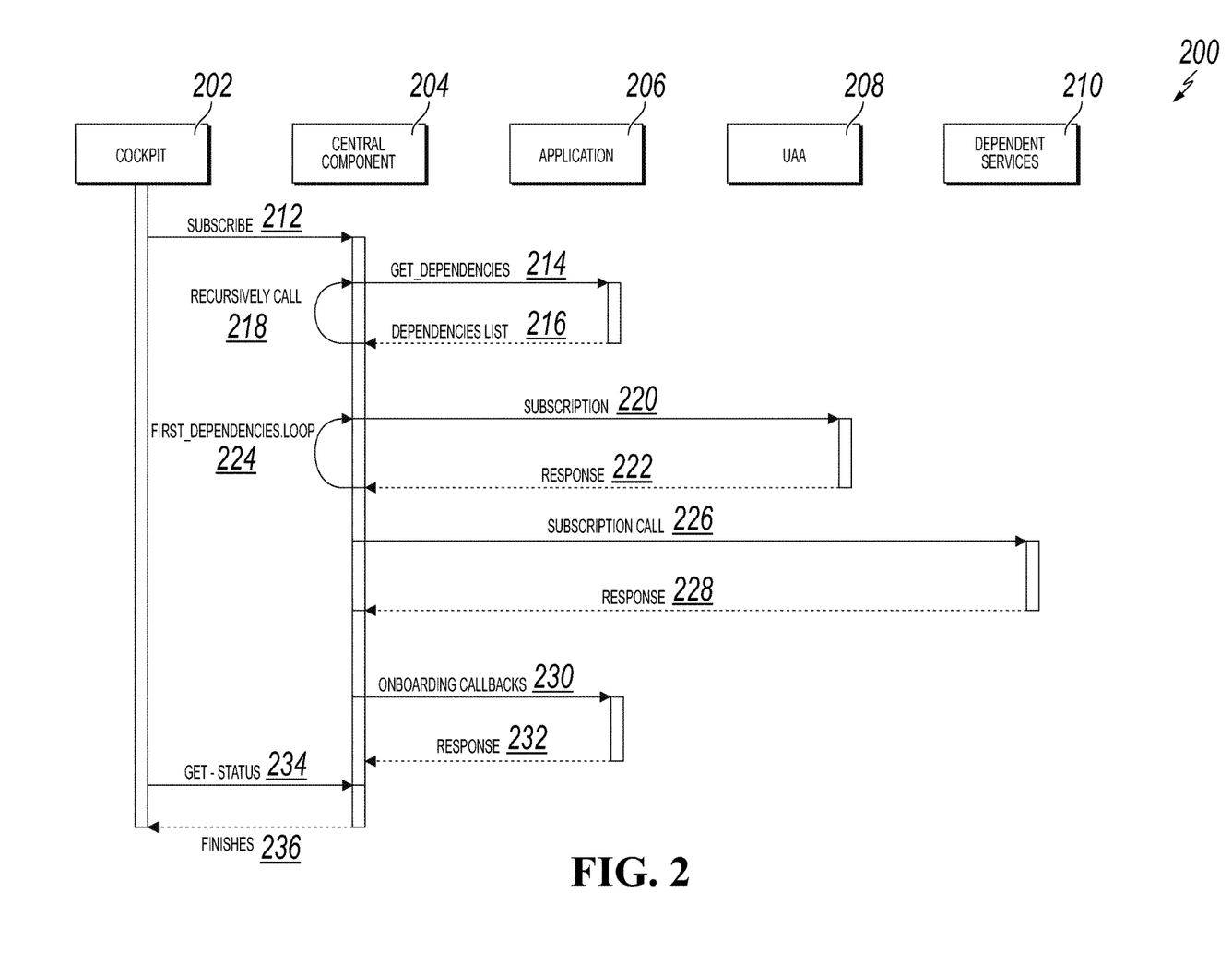
FIG. 2 is a block diagram illustrating a high-level sequence of events in an example of a method for subscribing a tenant (or "Tenant") to multi-Tenant services, according to an implementation of the present disclosure.

FIG. 2 is a block diagram illustrating a high-level sequence of events in an example of a method 200 for subscribing a Tenant to multi-Tenant services, according to an implementation of the present disclosure. As illustrated, FIG. 2 includes a Cockpit 202, a central management component (Central Component 204), an Application 206, a User Account and Authorization (UAA) 208, and dependent Services 210. In some implementations, one or more of the illustrated components can be implemented in multi-Tenant computing environments (for example, a cloud computing environment such as CLOUD FOUNDRY). In some implementations, the illustrated components can be connected over a network. In some implementations, the illustrated components can be integrated on one or more computing devices.

According to the sequence of events 200, Cockpit 202 sends a subscribe request (subscribe 212) to the Central Component 204 upon receipt of a Tenant request to subscribe to an Application (for example, Application 206). In some implementations, the Cockpit 202 is a computing device that receives the Tenant requests. For example, the Cockpit 202 can be a personal computer, or a computing device in communication with the Tenant's personal computer over a network. In some implementations, the Central Component 204 plays a managerial role in provisioning Services associated with the requested Application. For example, in some implementations, the Cockpit 202 can be a web Application calling Services that are provided by the Central Component 204 (for example, provisioning Services). In some implementations, the Central Component 204 provides the On-Boarding Service.

In some implementations, the Central Component 204 is in communication with one or more Applications (for example Application 206) to which the Tenant may subscribe. In some implementations, when a Tenant subscribes to an Application, the Tenant also indirectly subscribes to a Service consumed by the Application. In some instances, the Central Component 204 sends an inquiry (for example get_dependencies 214) to the requested Application 206, asking about the Services that the Application consumes. In response, the Application 206 provides a list of Services that the Application depends on, for example through dependencies list 216. The dependencies list 216 can contain one or more Services that depend from other Services (sub-Services). Thus, the Central Component 204 performs one or more recursive calls (for example, recursive call 218) to obtain the dependencies of these Services until all Services that the Application ultimately depends on (or consumes) are identified.

In some implementations, the Central Component 204 sends the list of the dependent Services (for example through subscription 220) to UAA 208. In some implementations, at UAA 208, each Service has at least one OPEN AUTHORIZATION (OAUTH) Client of the Service. In some implementations, for each Service in the subscription 220 the UAA 208 copies the OAUTH Client of the Service to the Tenants. In some examples, the Central Component 204 sends a list of identifiers (IDs) that identify the services to the UAA 208. UAA 208 has a mapping of Service IDs to OAUTH Clients of the Services. When UAA 208 receives the list of IDs, the UAA 208 searches for corresponding OAUTH Clients and copies them to the Tenants. In some implementations, the UAA 208 sends a response 222 reporting that a Tenant has been associated with the Services. In some implementations, the Central Component 204 sends one subscription 220 that includes all Services that the Application 206 depends upon. In some implementations, the Central Component 204 sends more than one subscription 220 to cover all such Services.

In some implementations, the Central Component 204 performs dependencies-loops 224 to cover all dependent Services. For instance, the Central Component 204 can be configured to send subscription 220 for sub-Services of a Service, after receiving and performing a response 222 and a dependencies-loop 224 associated with the Service, respectively.

Figure 3:
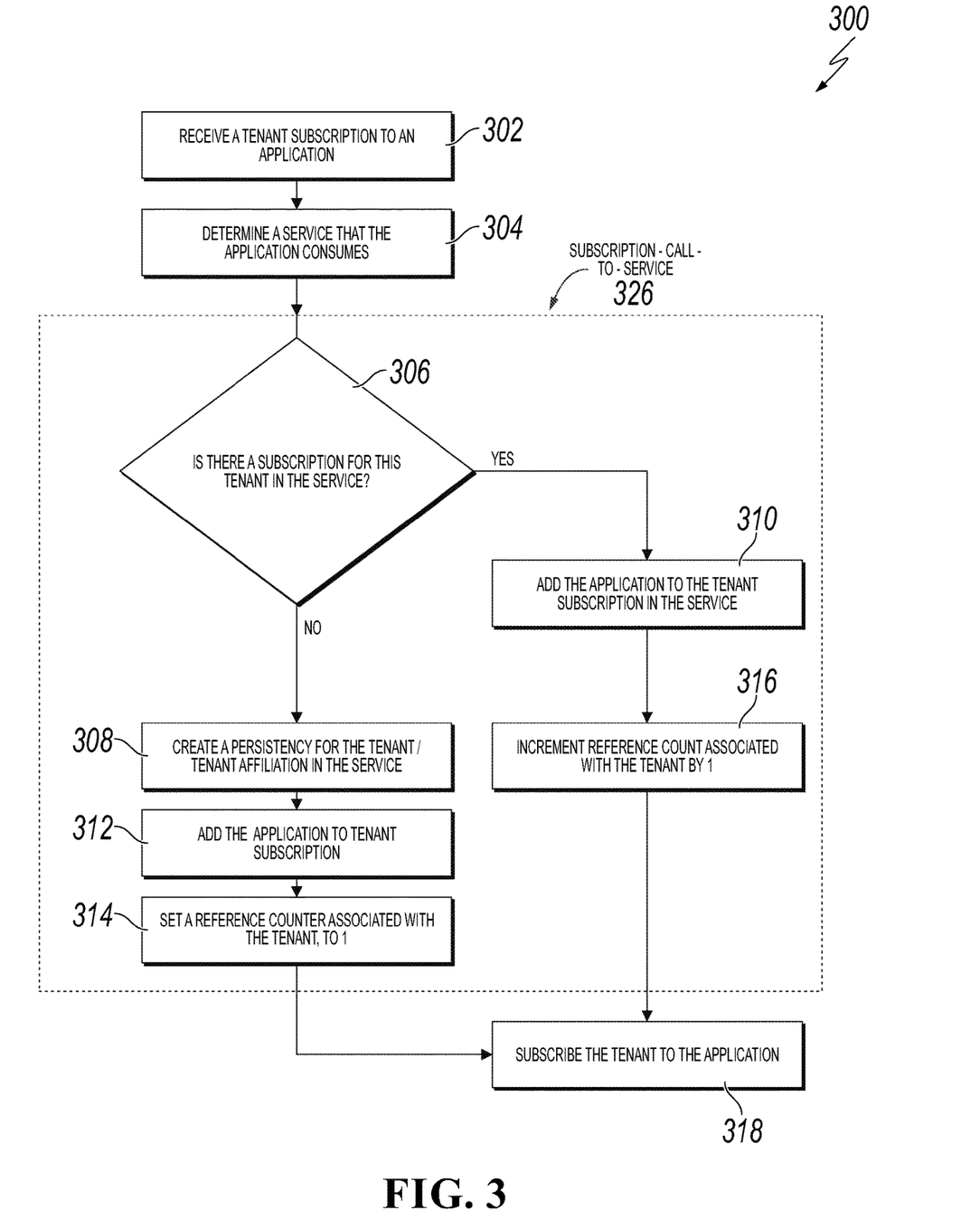
FIG. 3 is a flowchart illustrating a lower level example of a method for subscribing a Tenant to a Tenant-aware Service, according to the present invention.

Having the list of dependent Services, the Central Component 204 sends a subscription call 226 (for example subscription-call-to-service 326) to the dependent Services 210. In some implementations, the dependent Services 210 includes all dependent Services and sub-Services. In some implementations, the subscription call 226 causes invocation of a subscription API (or "Callbacks" because the Application needs to register its own callback and those of its direct dependent services, which also register their dependent Services' callbacks (for example, with get_dependencies 214)) of each of the dependent Services and sub-Services (hereinafter, "Services"). In some implementations, the subscription call 226 acts as an On-Boarding Callback of the dependent Services and invokes an On-Boarding Service associated with one or more dependent Services. In some implementations, the dependent Services 210 respond (for example by one or more responses 228) to the Central Component 204 indicating that the Tenant has been subscribed to the Services, or confirming the receipt of the subscription call 226.

In some implementations, the Central Component 204 sends the Application 206 On-Boarding callbacks 230. In some examples, an On-Boarding callback 230 activates the Application 206 to provide one or more of the dependent Services 210. In some instances, the Application 206 sends back response 232. For example, the response 232 can indicate that the Application 206 has received the On-Boarding callbacks 230.

In some implementations, the Cockpit 202 sends an inquiry (for example get-status 234) to the Central Component 204 inquiring on the subscription status. In some implementations, the Central Component 204 sends the Cockpit 202 a notification (for example finish 236) informing the Cockpit 202 that the subscription operation has been completed.

FIG. 3 is a flowchart illustrating a lower level example of a method 300 for subscribing a Tenant to a Tenant-aware Service, according to an implementation of the present disclosure. As illustrated, method 300 includes a subscription-call-to-service 326, which can be for example the subscription call 226. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order. In some implementations, all communication between elements in method 300 is encrypted (for example, using HTTPS).

At 302, a Tenant request to subscribe to an Application is received. For example, the Tenant request can be received at the Cockpit 202 or at the Central Component 204. For example, the Tenant can request subscription to Application 206. From 302, method 300 proceeds to 304.

At 304, a Service that the Application consumes (a Dependent Service 210) is determined. For example, applying 304 to Application 206, 304 determines at least one of the Services of the Dependent Services 210. In some implementations, all Services that the Application 206 consumes are determined at 304. For example, the Central Component 204 can perform one or more recursive call 218 to obtain all Dependent Services 210 of the Application 206. From 304, method 300 proceeds to 306.

At 306, a determination is made as to whether a subscription for the Tenant exists in the Service. In some implementations, 306 is performed in the Service upon receiving a subscription-call-to-service 326. In some implementations, 306 is performed at an On-Boarding Service to which the Service is registered for Tenant subscription purposes. In some implementations, the Tenant is affiliated to a group or business. For example, members (Tenants) of a gaming group may want to share the same features of the Service, but be isolated from other gaming groups. In these implementations, 306 checks for a subscription for the Tenant (or Tenant affiliations) in the Service, as well. If no subscription for the Tenant (or Tenant affiliation) exists in the Service (that is, the Tenant is new to the Service), method 300 proceeds to 308; otherwise, it proceeds to 310.

At 308, a persistency is created for the Tenant in the Service. In some implementations, a subscription associated with the persistency is created for the Tenant to include the Application 206. In some implementations, the subscription is implicit in the creation of the persistency. In some implementations, the persistency covers both the Tenant and Tenant affiliations. From 308, method 300 proceeds to 312.

At 312, the Application is added to the Tenant subscription in the Service. A Tenant subscription (or "subscription") is associated with the Tenant persistency. In some implementations, the subscription includes a list of Applications 206 that consume the Service and at 312 the requested Application 206 being added to the list. In some implementations, for each Application 206, a subscription is created in the Service; but all subscriptions of a Tenant are associated with the same persistency in the Service. From 312, method 300 proceeds to 314.

Note that in some implementations, 308 and 312 can be performed in the opposite order. In these and the described implementations, 308 and 312 are performed together, but can be configured, depending on particular implementations, for 312 to be performed before 308.

At 314, a reference counter associated with the Tenant subscription is set to 1. The reference counter counts the number of Tenant-subscribed Applications 206 that consume the Service. In some implementations, the reference counter is associated with the Tenant affiliations (for example, when the subscription is associated with a Tenant affiliation). From 314, method 300 proceeds to 318.

At 318, the Tenant is subscribed to the Application 206. In some implementations, once the Tenant is subscribed to the Application 206, the Application 206 is able to call the Dependent Services 210 in the context of the Tenant.

If it is determined that a subscription for the Tenant existed at 306, the method 300 proceeds to 310. The existence of a Tenant subscription on a Service indicates that a Tenant persistency also exists in the Service. In other words, the Tenant's first connection to the Service had happened upon the Tenant's request to subscribe to another Application 206 that consumes the Service; which led to creation of a persistency (by 308) and a subscription associated with the persistency for the Tenant in the Service. Once a subscription for the Tenant is detected (at 306), 308 does not have to be re-performed. Instead, the method 300 proceeds to 310.

At 310, the Application 206 is added to Tenant subscription in the Service. In some implementations, the subscription includes a list of consuming Applications 206 and the Application 206 is added to the list. In some implementations, a new subscription is created in the Service for the Application 206. The new subscription and the already existing subscriptions of the Tenant are associated with the same persistency in the Service. From 310, method 300 proceeds to 316.

At 316, the reference counter associated with the Tenant subscription is incremented by 1. The reference counter counts the Tenant-subscribed Applications 206 that consume the Service. In some implementations, a subscription is capable of covering Tenant affiliates as well. In these implementations, the reference counter is capable of counting a number of Applications 206 that consume the Service and are requested (that is, requested to be subscribed) by any of the Tenants within the Tenant affiliate. From 316, method 300 proceeds to 318.

The general idea behind method 300 works for isolating data per Tenant in any Tenant-aware Services, including both the upper left and the upper right Services. Consider Master Data as an example of upper left Service. For example, assume a Tenant has subscribed to a financial Application that consumes the Master Data. If the Tenant wants to subscribe to another Application 206, for example a trading Application, that uses the same Master Data, no new persistency will be created because a subscription associated with the Tenant already exists in the Master Data (which was created when the Tenant subscribed to the financial Application). Therefore, the method proceeds from 306 to 310 and adds the trading Application to the existing subscriptions of the Tenant.

With a little modification, method 300 works for upper right Services. In some implementations, the upper right Services include more information in their subscription call, to isolate data by the instance as well. In some implementations, at 304, Service Instances that the Application 206 uses for consuming dependent Services are determined. In these implementations, the later procedures in method 300 are applied on Service Instances of Dependent Services 210 rather than on the dependent Services 210 themselves. In this case, the Service knows for which Service Instance the Tenant subscription takes place. As a result, the Service configuration of each dependent Service knows specifically which Service Instance (isolation by instance) and which Tenant subscription (isolation by Tenant) are being used. The reference counter in this case counts Applications 206 per Tenant (or Tenant affiliates) for each Service Instance.

In some implementations, the Central Component 204 has the capability to decide which Service type (for any of the four Service types) is being consumed and include the proper information in subscription call 226 (for example subscription-call-to-service 326). In some implementations, the Central Component 204 sends the detailed information that are needed for an upper right Service and let the Service to decide and select the information that it needs. For example, the Central Component 204 send the detailed information, and if a Service is an upper left Service, it ignores the information regarding the Service Instances and subscribes the Tenant as a subscription to a Tenant-aware/shared-instance Service. In some implementations, if the Service is a Tenant-unaware Service, the Service can ignore one or more data of the subscription call regarding the Tenant (for example, for Tenant-unaware Services).

The reference counter in method 300 can be a separate or an internal component in the Central Component 204 (which is called by the Service), or can be a counter within the Service. In some implementations, the reference counter for a Tenant is the number of OAUTH Client of Services (for example OAUTH Clients of the Service or client credentials) copied for the Tenant upon the Tenant subscription request. As explained above, upon sending subscription 220 to UAA 208, an OAUTH Client of Service by which an Application 206 calls a Service is copied for the Tenant. Accordingly, in these implementations, each new Tenant subscription to an Application 206 includes making a new copy of the OAUTH Client of Service for the Tenant. In some examples, instead of (or in addition to) counting separately, the Service checks with the UAA 208 on how many copies of the OAUTH Client of Service for the Tenant have been made. The UAA 208 is aware of all Tenants. In some implementations, the UAA 208 maintains a table of OAUTH clients for each Tenant. To this table, the OAUTH client of a newly subscribed Service is copied. The UAA 208 call the Tenant domain an "identity zone."

In some implementations, 306 can be replaced by a check on the number of OAUTH Client of Services associated with the Applications 206 that have been copied for the Tenant. Accordingly, if the number is greater than 1, the Tenant has already subscribed to an Application 206 that consumes the Service; thus, the Tenant has been subscribed to the Service and method 300 proceeds to 310. If the number is 1, no subscription for the Tenant existed before in the Service and the method proceeds to 308. In these implementations, there is no need for performing steps 314 or 316. As copying OAUTH clients 220 happens before 306, the number will already be 1 (or more than 1) and never 0, as a new subscription already counts.

In some implementations, depending on how many Applications 206 the Tenant uses to consume the Service, unsubscribing the Application 206 has different effects on the Tenant's subscription in the Service.

Figure 4:
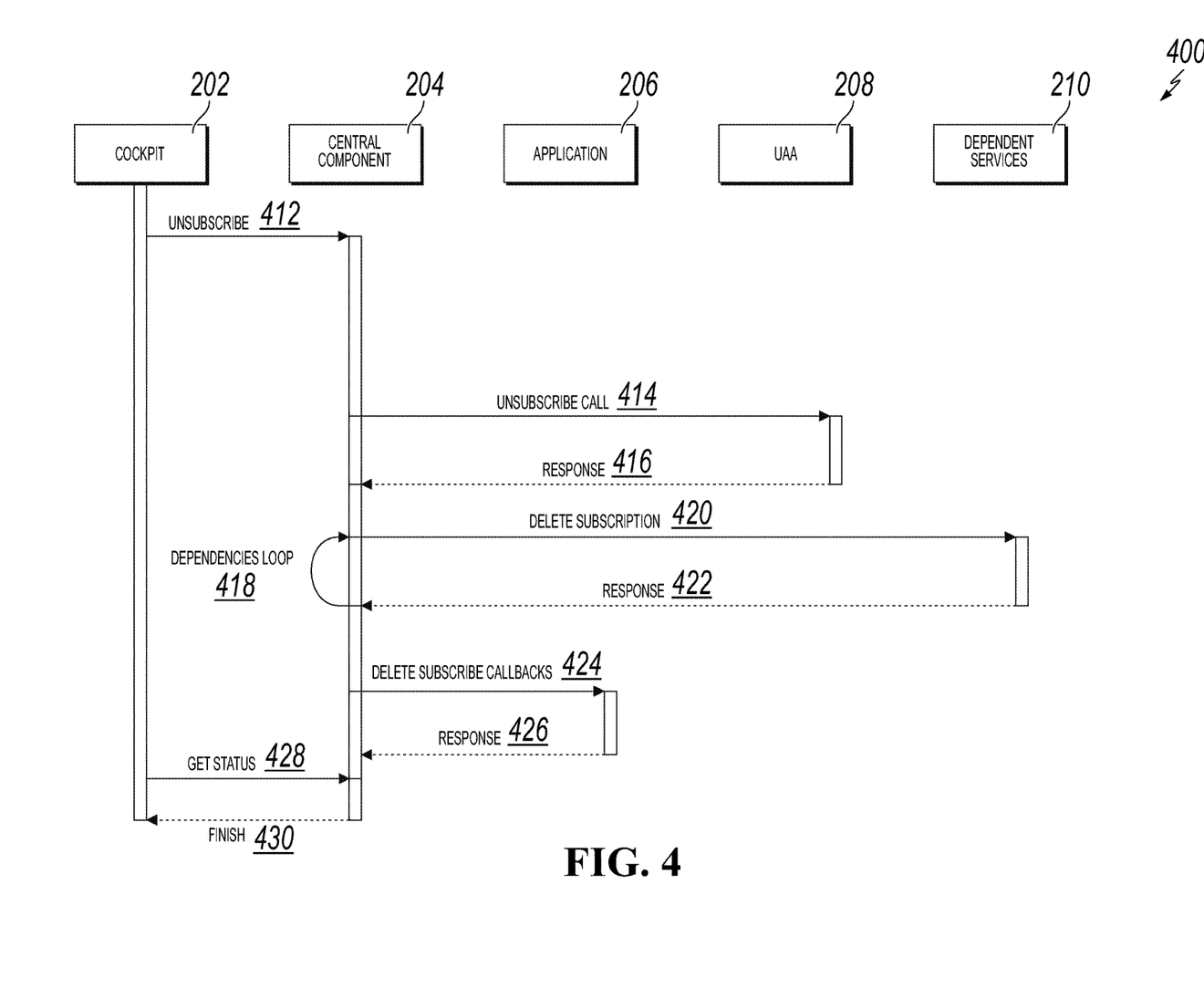
FIG. 4 is a block diagram illustrating a high-level sequence of events in an example of a method for unsubscribing a Tenant from a Service, according to an implementation of the present disclosure.

FIG. 4 is a block diagram illustrating a high-level sequence of events in an example of a method 400 for unsubscribing a Tenant from a Service, according to an implementation of the present disclosure. As illustrated, FIG. 4 includes similar components as FIG. 2 does, such as Cockpit 202, Central Component 204, Application 206, UAA 208, and dependent Services 210. These components can be in communication to each other as explained in FIG. 2.

When a Tenant unsubscribes from an Application 206), the Central Component 204 receives a notification message; for example, the Cockpit 202 sends an unsubscribe message 412 to the Central Component 204. The Central Component 204 determines one or more Services that the Application 206 consumes. In some implementations, the Central Component 204 has stored information on dependent Services from previous inquiries to the Application (for example from the calls 214, 216, and 218). In some implementations, the Central Component 204 sends a series of calls (not illustrated) similar to 214, 216, and 218, to determine the Services that the Application 206 consumes.

Based on the determined dependent Services, the Central Component 204 sends an unsubscribe call 414 (for example, one or more unsubscribe-call-to-service 520) to the dependent Services (for example, Dependent Services 210). Once the unsubscribed call 414 is received, the Service perform unsubscribing process. In some implementations, the unsubscribing process (for example, unsubscribing process 500 as described in FIG. 5) is performed based on how many other Tenant-subscribed Applications 206 consume the Service. In some implementations, the Dependent Services 210 send one or more responses 416 to the Central Component 204, indicating that the un-subscription has been performed, or that the unsubscribe call 414 has been received.

In some implementations, the Central Component 204 sends a delete subscribe callback 424 to the Application 206. In response, the Application 206 deletes the Tenant's subscription to the Application 206 and deletes the persistence associated with this Tenant if this was the last subscription of an application to this service for the Tenant. In some implementations, the Application 206 sends back a response 426, informing the Central Component 204 that the Tenant has been unsubscribed.

In some implementations, the Central Component 204 sends a delete subscription 420 message to UAA 208. Then, the UAA 208 deletes the OAuth Client of Service (for example an OAUTH Client) associated to the Application that it had copied for the Tenant. In some implementations, the UAA 208 sends a response 422 and informs the Central Component 204 that the deletion has been performed or that the delete subscription 420 has been received. In some implementations, the Central Component 204 goes through one or more dependencies loops 418 to send delete subscription message 420 for all Services (including the sub-Services) that the Application 206 consumes, to the UAA 208.

Figure 5:
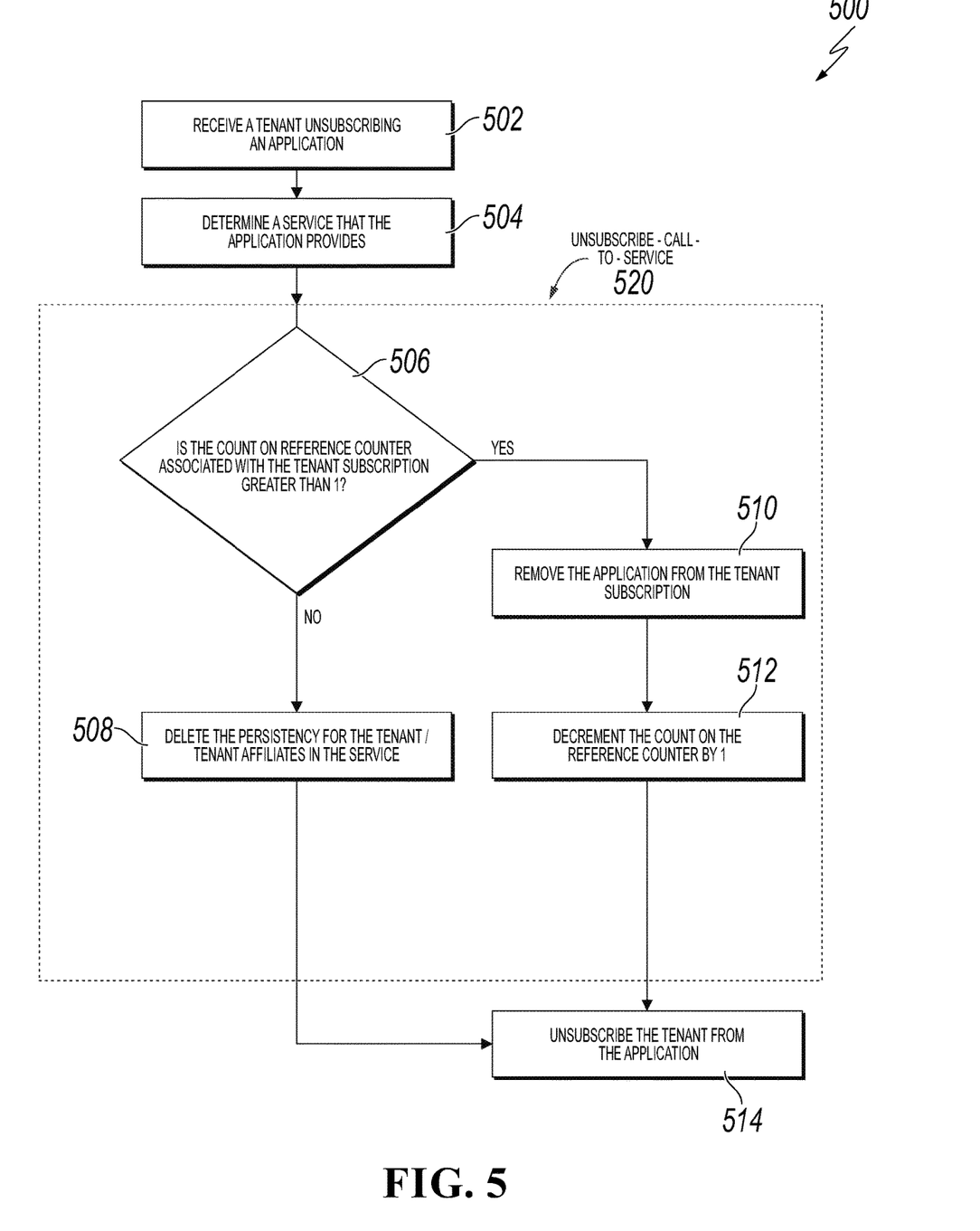
FIG. 5 is a flowchart illustrating a lower-level example of a method for unsubscribing a Tenant from a Service, according to the present invention.

In some implementations, the Cockpit 202 sends an inquiry (for example get-status 428) to the Central Component 204 inquiring on the subscription status. In some implementations, the Central Component 204 sends the Cockpit 202 a notification (for example finish 430 notification) informing the Cockpit 202 that the subscription operation has been completed FIG. 5 is a flowchart illustrating a lower-level example of a method 500 for unsubscribing a Tenant from a Service, according to an implementation of the present disclosure. As illustrated, method 500 includes an unsubscribe-call-to-service 520, which can be for example the unsubscribe call 414. For clarity of presentation, the description that follows generally describes method 500 in the context of the other figures in this description. However, it will be understood that method 500 may be performed, for example, by any suitable system, environment, software, and hardware, or a combination of systems, environments, software, and hardware, as appropriate. In some implementations, various steps of method 500 can be run in parallel, in combination, in loops, or in any order. In some implementations, all communication between elements in method 500 is encrypted (for example, using HTTPS).

At 502, a Tenant request to unsubscribe an Application (for example, Application 206) is received. For example, the Tenant request can be received at a Cockpit (for example, Cockpit 202), or at a Central Component (for example, Central Component 204). For example, the Tenant can request un-subscription from Application 206. From 502, method 500 proceeds to 504.

At 504, a Service that the Application consumes (a Dependent Service (for example, Dependent Service 210)) is determined. In some implementations, a list of the Dependent Services 210 is stored in the Central Component 204 from the 214, 216, and 218 calls. From 504, method 500 proceeds to 506.

At 506, a determination is made as to whether the count on the reference counter of the Tenant (or the Tenant affiliates) subscription is greater than 1. If the count is 1, method 500 proceeds to 508; if the count is greater than 1, method 500 proceeds to 510.

At 508, the persistency for the Tenant (or the Tenant affiliate) is deleted. A count equal to 1 indicates that the Tenant is connected to the Service only through one Application 206. In other words, the Tenant is subscribed to only one Application 206 that consumes the Service. This is the same Application 206 that the Tenant has requested to unsubscribe at 502. Thus, once unsubscribed from this Application 206, there is no other Application 206 through which the Tenant consumes the Service; and there would be no need to keep the Tenant's persistency in the Service. Accordingly, at 508, the Service deletes the Tenant's persistency (along with the reference counter and subscription associated to the Tenant). From 508, method 500 proceeds to 514.

At 514, the Tenant is unsubscribed from the Application 206. In some implementations, 514 is accompanied with a message (for example, Finish 430 message) to the Tenant (or the Cockpit 202) confirming the Tenant's un-subscription from the Application 206.

If 506 determines that the count is greater than 1, method 500 proceeds to 510.

At 510, the Application 206 is removed from Tenant subscription. When the count on the reference number associated with the Tenant subscription is greater than one, the Tenant is connected to the Service through more than one Application 206. In other words, the Tenant is subscribed to multiple Applications 206 (for example a financial Application and a trading Application) that consume the Service. Contrary to 508, unsubscribing from one of these Applications 206 (for example the financial Application), does not result in losing connection to the Service through the other Applications 206 (for example the trading application) to which the Tenant is subscribed. Thus, other than losing an Application 206, the Tenant's persistency is intact in 510. In implementations that create one subscription for each Tenant-subscribed Application 206, the subscription associated with the Application 206 is deleted. In implementations that have a list of Tenant-subscribed Applications, the Application is deleted from the list. From 510, method 500 proceeds to 512.

At 512, the reference counter associated with the Tenant subscription is decremented by 1. This decrementing is an indication of losing an Application 206 in the Tenant subscriptions. From 512, method 500 proceeds to 514.

Alternatively, in some implementations, a number of OAUTH Client of Services (for example OAUTH Clients of the Service or client credentials) copied for the Tenant are checked at 506. In these implementations, at 506 a determination is made as to whether the number is greater than 1. In response to determining that the number is greater than 1, method 500 proceeds to 510; otherwise, the method 500 proceeds to 508. In some instances, the number of OAUTH Client of Services is used as the count on the reference counter. In these alternative implementations, 512 does not need to be performed; as a UAA (for example, UAA 208) keeps track of the number (or the count) based on delete subscription 420 messages received by the UAA 208.

Figure 6:
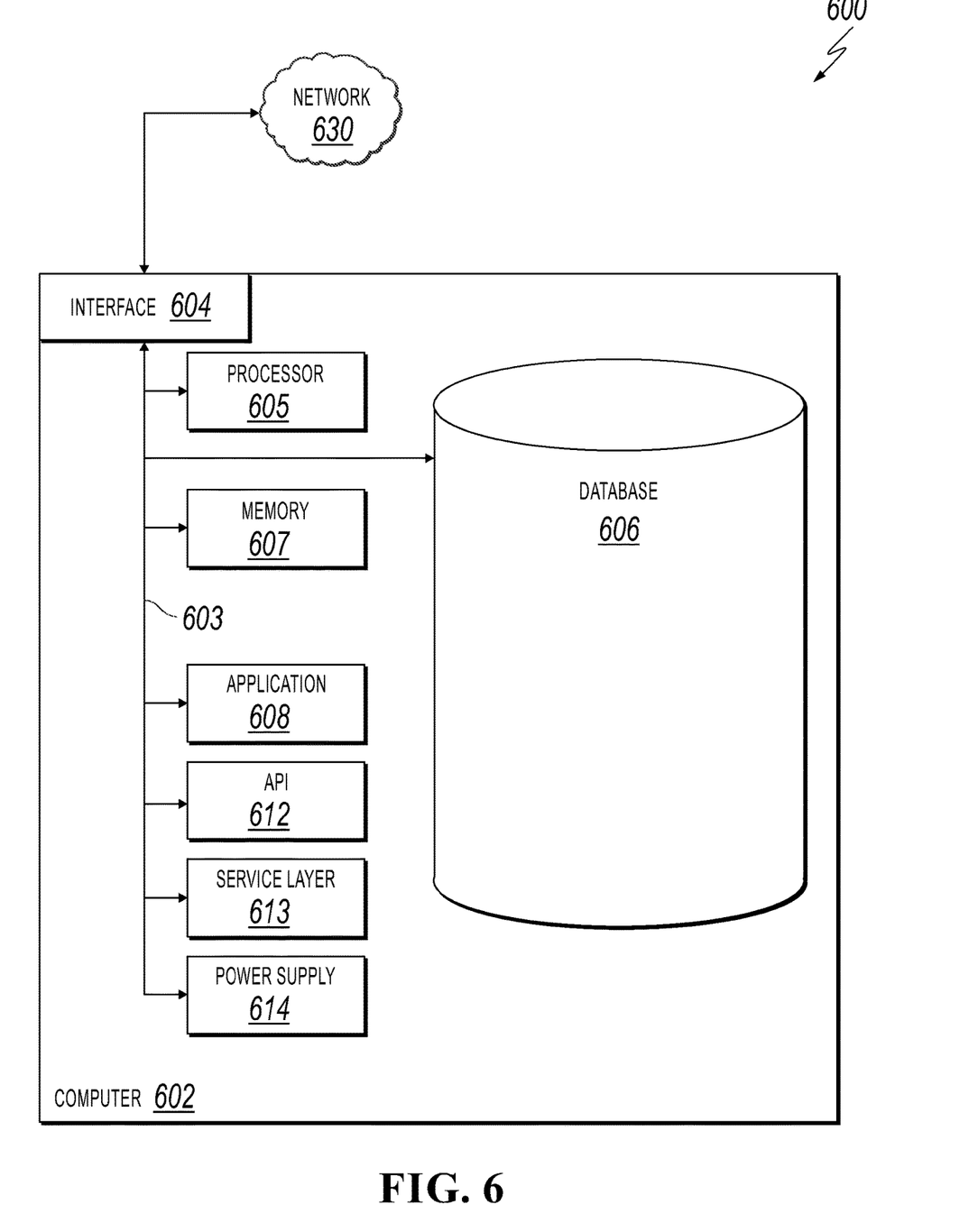
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, receiving, at one or more computers, a Tenant request to subscribe to a first Application; determining, by the one or more computers, a first Service that the first Application consumes; and determining, by the one or more computers, that the Tenant is new to the first Service; and in response, providing, by the one or more computers, a subscription of the Tenant in the first Service; and providing, by the one or more computers, the first Application to be added to the subscription of the Tenant in the first Service.

The foregoing and other described implementations can each, optionally, include one or more of the following features:

A first feature, combinable with any of the following features, comprising determining, by the one or more computers, that the subscription of the Tenant exists on the first Service; and in response to determining that the subscription of the Tenant exists in the first Service, providing, by the one or more computers, the first Application to be added to the subscription of the Tenant in the first Service.

A second feature, combinable with any of the previous or following features, wherein the subscription is associated with a reference counter counting number of Applications that consume the first Service and are subscribed by the Tenant.

A third feature, combinable with any of the previous or following features, wherein the number on the reference counter is determined by a number of Service OPEN AUTHORIZATION (OAUTH) Clients provided for each Tenant request to an Application subscription.

A fourth feature, combinable with any of the previous or following features, comprising providing a persistency for the subscription of the Tenant in the first Service.

A fifth feature, combinable with any of the previous or following features, comprising receiving, at the one or more computers, a Tenant request to unsubscribe from a second Application; determining, by the one or more computers, a second Service associated with the second Application; determining, by the one or more computers, a reference counter number associated with a Tenant subscription on the second Service; and, determining, by the one or more computers, that the reference counter number is greater than one, and, in response, requesting, by the one or more computers, removal of the second Application from the Tenant subscription on the second Service A sixth feature, combinable with any of the previous or following features, comprising determining, by the one or more computers, that the counter number is equal to one, and in response, requesting, by the one or more computers, removal of the Tenant subscription from the second Service.

In a second implementation, a non-transitory, computer-readable medium storing one or more instructions executable by a computer system to perform operations comprising: receiving a Tenant request to subscribe to a first Application; determining a first Service that the first Application consumes; and determining that the Tenant is new to the first Service; and in response, providing a subscription of the Tenant in the first Service; and providing the first Application to be added to the subscription of the Tenant in the first Service.

The foregoing and other described implementations can each, optionally, include one or more of the following features:

A first feature, combinable with any of the following features, comprising one or more instructions executable to perform: determining that the subscription of the Tenant exists on the first Service; and in response to determining that the subscription of the Tenant exists in the first Service, providing the first Application to be added to the subscription of the Tenant in the first Service.

A second feature, combinable with any of the previous or following features, wherein the subscription is associated with a reference counter counting number of Applications that consume the first Service and are subscribed by the Tenant.

A third feature, combinable with any of the previous or following features, wherein the number on the reference counter is determined by a number of Service OPEN AUTHORIZATION (OAUTH) Clients provided for each Tenant request to an Application subscription.

A fourth feature, combinable with any of the previous or following features, comprising one or more instructions executable to perform providing a persistency for the subscription of the Tenant in the first Service.

A fifth feature, combinable with any of the previous or following features, comprising one or more instructions executable to perform: receiving a Tenant request to unsubscribe from a second Application; determining a second Service associated with the second Application; determining a reference counter number associated with a Tenant subscription on the second Service; and determining that the reference counter number is greater than one, and in response, requesting removal of the second Application from the Tenant subscription on the second Service.

A sixth feature, combinable with any of the previous or following features, comprising one or more instructions executable to perform determining that the counter number is equal to one, and in response, requesting, by the one or more computers, removal of the Tenant subscription from the second Service.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a Tenant request to subscribe to a first Application; determining a first Service that the first Application consumes; and determining that the Tenant is new to the first Service; and in response: providing a subscription of the Tenant in the first Service; and providing the first Application to be added to the subscription of the Tenant in the first Service.

The foregoing and other described implementations can each, optionally, include one or more of the following features:

A first feature, combinable with any of the following features, further configured to: determine that the subscription of the Tenant exists on the first Service; and in response to determining that the subscription of the Tenant exists in the first Service, providing the first Application to be added to the subscription of the Tenant in the first Service.

A second feature, combinable with any of the previous or following features, wherein the subscription is associated with a reference counter counting number of Applications that consume the first Service and are subscribed by the Tenant.

A third feature, combinable with any of the previous or following features, wherein the number on the reference counter is determined by a number of Service OPEN AUTHORIZATION (OAUTH) Clients provided for each Tenant request to an Application subscription.

A fourth feature, combinable with any of the previous or following features, further configured to provide a persistency for the subscription of the Tenant in the first Service.

A fifth feature, combinable with any of the previous or following features, further configured to: receive a Tenant request to unsubscribe from a second Application; determine a second Service associated with the second Application; determine a reference counter number associated with a Tenant subscription on the second Service; determine that the reference counter number is greater than one, and in response, request removal of the second Application from the Tenant subscription on the second Service; and determine that the counter number is equal to one, and in response, request removal of the Tenant subscription from the second Service.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer readable media for storing computer program instructions and data can include all forms of permanent/non-permanent or volatile/non-volatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital versatile/video disc (DVD), compact disc (CD) ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at one or more computers, a Tenant request associated with a Tenant to unsubscribe from a first Application;
   determining, by the one or more computers, a first Service associated with the first Application;
   determining, by the one or more computers, a reference counter number associated with a Tenant subscription on the first Service, wherein the reference counter number is determined by a number of Service OPEN AUTHORIZATION (OAUTH) Clients provided for each Tenant request to unsubscribe from an Application subscription;
   determining, by the one or more computers, whether the reference counter number is greater than one or equal to one; and
   in response to determining that the reference counter number is greater than one:
      requesting, by the one or more computers, removal of the first Application from the Tenant subscription on the first Service.

2. The computer-implemented method of claim 1, wherein the reference counter number counts number of Applications that consume the first Service and are subscribed by the Tenant, and wherein
   in response to determining that the reference counter number is greater than one further comprises:
   decrementing the reference counter number by one.

3. The computer-implemented method of claim 1, further comprising:
   in response to determining that the reference counter number is equal to one, requesting deletion of persistency for the Tenant subscription in the first Service.

4. The computer-implemented method of claim 3, wherein in response to determining that the reference counter number is equal to one further comprises:
   requesting removal of the Tenant subscription in the first Service.

5. The computer-implemented method of claim 1, further comprising:
   in response to determining that the reference counter number is equal to one, requesting removal of the Tenant subscription from the first Application.

6. The computer-implemented method of claim 1, further comprising, prior to receiving the Tenant request to unsubscribe from the first Application:
   receiving, at the one or more computers, a Tenant request to subscribe to the first Application;
   determining, by the one or more computers, the first Service that the first Application consumes; and
   determining, by the one or more computers, that the Tenant is new to the first Service; and
   in response:
      providing, by the one or more computers, the Tenant subscription of the Tenant in the first Service; and
      providing, by the one or more computers, the first Application to be added to the Tenant subscription of the Tenant in the first Service.

7. A non-transitory, computer-readable medium storing one or more instructions executable by a computer system to perform operations comprising:
   receiving, at one or more computers, a Tenant request associated with a Tenant to unsubscribe from a first Application;
   determining, by the one or more computers, a first Service associated with the first Application;
   determining, by the one or more computers, a reference counter number associated with a Tenant subscription on the first Service, wherein the reference counter number is determined by a number of Service OPEN AUTHORIZATION (OAUTH) Clients provided for each Tenant request to unsubscribe from an Application subscription;
   determining, by the one or more computers, whether the reference counter number is greater than one or equal to one; and
   in response to determining that the reference counter number is greater than one:

requesting, by the one or more computers, removal of the first Application from the Tenant subscription on the first Service.

8. The non-transitory, computer-readable medium of claim 7, wherein the reference counter number counts number of Applications that consume the first Service and are subscribed by the Tenant, and wherein
in response to determining that the reference counter number is greater than one further comprises:
decrementing the reference counter number by one.

9. The non-transitory, computer-readable medium of claim 7, further comprising:
in response to determining that the reference counter number is equal to one, requesting, by the one or more computers, deletion of persistency for the Tenant subscription in the first Service.

10. The non-transitory, computer-readable medium of claim 9, wherein in response to determining that the reference counter number is equal to one further comprises:
requesting, by the one or more computers, removal of the Tenant subscription in the first Service.

11. The non-transitory, computer-readable medium of claim 7, further comprising
in response to determining that the reference counter number is equal to one, requesting, by the one or more computers, removal of the Tenant subscription from the first Application.

12. The non-transitory, computer-readable medium of claim 7, further comprising, prior to receiving the Tenant request to unsubscribe from the first Application:
receiving, at the one or more computers, a Tenant request to subscribe to the first Application;
determining, by the one or more computers, the first Service that the first Application consumes; and
determining, by the one or more computers, that the Tenant is new to the first Service; and
in response:
providing, by the one or more computers, the Tenant subscription of the Tenant in the first Service; and
providing, by the one or more computers, the first Application to be added to the Tenant subscription of the Tenant in the first Service.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at the one or more computers, a Tenant request associated with a Tenant to unsubscribe from a first Application;
determining, by the one or more computers, a first Service associated with the first Application;
determining, by the one or more computers, a reference counter number associated with a Tenant subscription on the first Service, wherein the reference counter number is determined by a number of Service OPEN AUTHORIZATION (OAUTH) Clients provided for each Tenant request to unsubscribe from an Application subscription;
determining, by the one or more computers, whether the reference counter number is greater than one or equal to one; and
in response to determining that the reference counter number is greater than one:
requesting, by the one or more computers, removal of the first Application from the Tenant subscription on the first Service.

14. The computer-implemented system of claim 13, wherein the reference counter number counts number of Applications that consume the first Service and are subscribed by the Tenant, and wherein
in response to determining that the reference counter number is greater than one further comprises:
decrementing the reference counter number by one.

15. The computer-implemented system of claim 13, further comprising:
in response to determining that the reference counter number is equal to one, requesting deletion of persistency for the Tenant subscription in the first Service.

16. The computer-implemented system of claim 15, wherein in response to determining that the reference counter number is equal to one further comprises:
requesting removal of the Tenant subscription in the first Service.

17. The computer-implemented system of claim 13, further comprising
in response to determining that the reference counter number is equal to one, requesting removal of the Tenant subscription from the first Application.

18. The computer-implemented system of claim 13, further comprising, prior to receiving the Tenant request to unsubscribe from the first Application:
receiving, at the one or more computers, a Tenant request to subscribe to the first Application;
determining, by the one or more computers, the first Service that the first Application consumes; and
determining, by the one or more computers, that the Tenant is new to the first Service; and
in response:
providing, by the one or more computers, the Tenant subscription of the Tenant in the first Service; and
providing, by the one or more computers, the first Application to be added to the Tenant subscription of the Tenant in the first Service.

* * * * *